Figure 3:
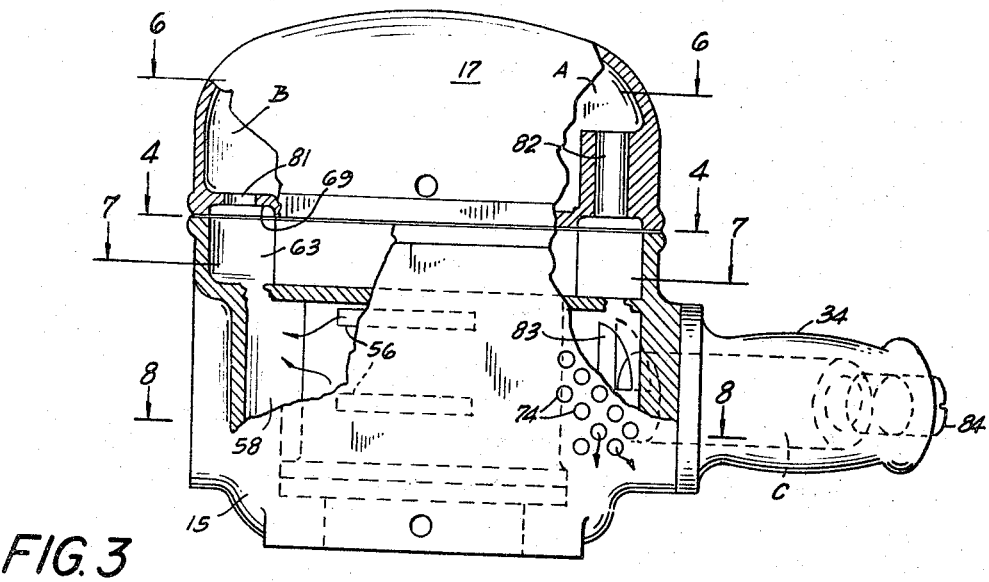

July 11, 1967
R. J. WALDRON
3,330,378
PNEUMATIC GRINDER WITH INTEGRAL EXHAUST SILENCER
Filed Sept. 30, 1964
5 Sheets-Sheet 1
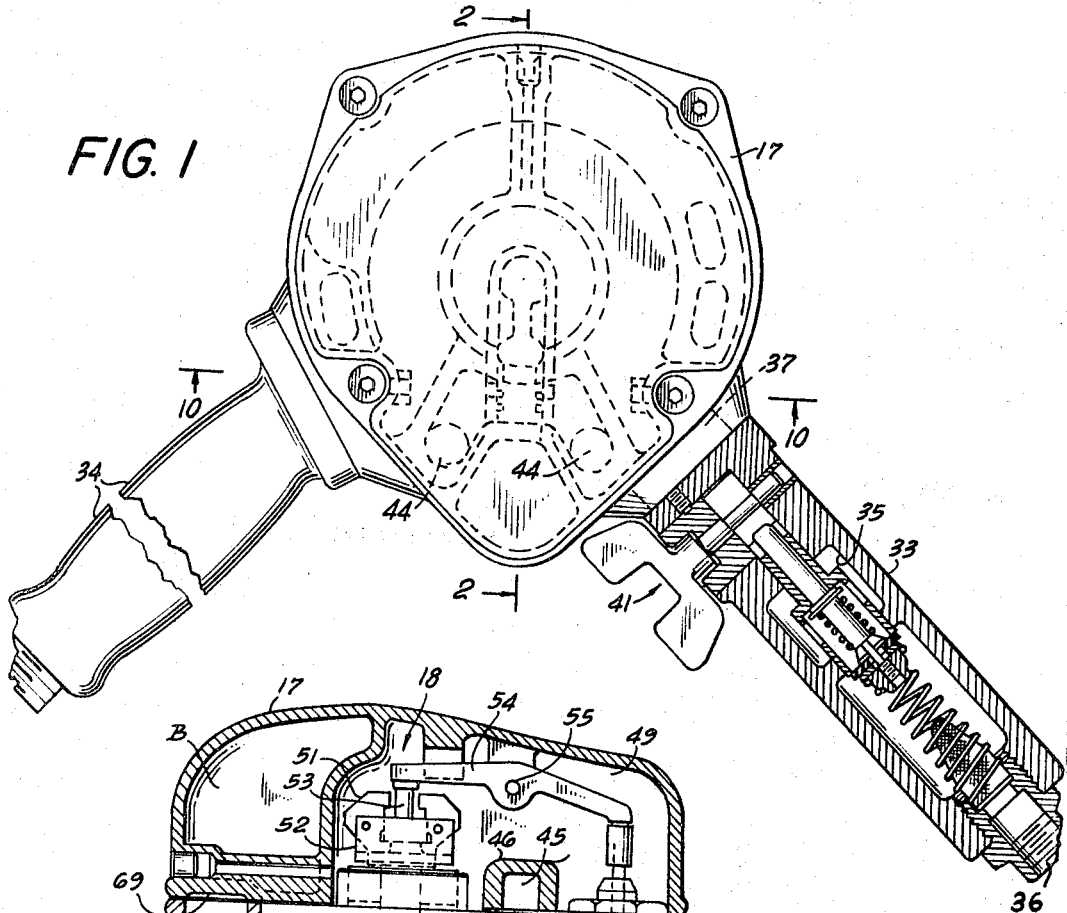
FIG. 1
FIG. 2
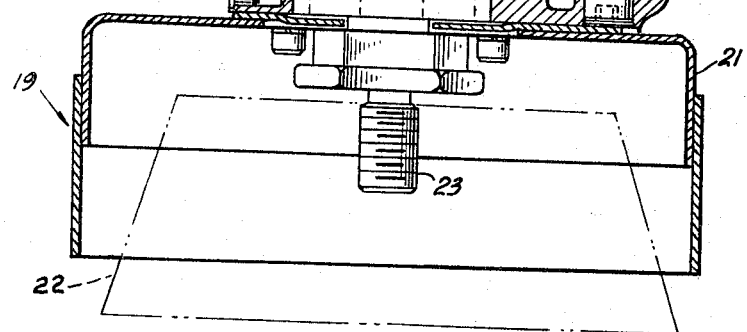
INVENTOR
ROBERT J. WALDRON
BY
ATTORNEY July 11, 1967 R. J. WALDRON 3,330,378
PNEUMATIC GRINDER WITH INTEGRAL EXHAUST SILENCER
Filed Sept. 30, 1964 5 Sheets-Sheet 2

INVENTOR
ROBERT J. WALDRON
BY
Stephen J. Rudy
ATTORNEY

July 11, 1967 R. J. WALDRON 3,330,378
PNEUMATIC GRINDER WITH INTEGRAL EXHAUST SILENCER
Filed Sept. 30, 1964 5 Sheets-Sheet 4

INVENTOR
ROBERT J. WALDRON
BY
Stephen J. Rudy
ATTORNEY

July 11, 1967  R. J. WALDRON  3,330,378
PNEUMATIC GRINDER WITH INTEGRAL EXHAUST SILENCER
Filed Sept. 30, 1964  5 Sheets-Sheet 5

INVENTOR
ROBERT J. WALDRON
BY
Stephen J. Rudy
ATTORNEY

United States Patent Office 3,330,378
Patented July 11, 1967

3,330,378
PNEUMATIC GRINDER WITH INTEGRAL EXHAUST SILENCER
Robert J. Waldron, Sauquoit, N.Y., assignor to Chicago Pneumatic Tool Company, New York, N.Y., a corporation of New Jersey
Filed Sept. 30, 1964, Ser. No. 400,324
10 Claims. (Cl. 181—36)

This invention relates to improvements in the construction of pneumatically powered rotary tools to provide the latter with a noise attenuating system forming an integral part of the tool.

The invention is illustrated herein as applied to a pneumatically powered rotary vertical grinder inasmuch as it is especially suited for this type of tool. A conventional vertical grinder includes a pneumatic motor of the rotary blade-type including a driving spindle on which is mounted a grinding wheel. The motor is mounted in a suitable housing having a pair of side handles which the operator grips as he operates the tool. The handles enable the operator to maneuver the tool about the surface of the work, and further enable him to transmit through the handles and housing variable pressures upon the grinding wheel in accordance with the demands of the work. Accordingly, during the operation of the tool the speed of the motor will vary as varying pressures are exerted by the operator on the tool. Air spent in rotating the motor is exhausted to atmosphere; and, upon expanding outside of the tool to atmosphere, the exhausted air produces an objectionable noise of the whining type varying in fundamental frequency, intensity and pitch.

The use of baffles and tortuous passages to muffle the exhaust noises of such tools is undesirable, as they would impede the flow of exhausting air and cause undesirable back pressure to develop. Such back pressure would interfere with the operating efficiency and power of the motor.

Mufflers of the type which would be attached to a side of the tool, or wrapped about the motor housing would be undesirable since they would enlarge the radial dimensions of the housing and thus prevent the most efficient use of the tool in close quarters.

The use of sound absorbing materials is also undesirable as such would tend to increase the bulk and weight of the tool.

Accordingly, an object of this invention is to provide a pneumatic rotary grinding tool having as an integral part of its housing a sound attenuating structure which does not undesirably add to the bulk, size or weight of the tool; and does not develop any undesirable back pressure to interfere with the power or operating efficiency of its motor.

A further and more general object of this invention is to provide in a pneumatic rotary grinding tool a sound attenuating system which functions to transform the usual objectionable complex exhaust noise of the tool into a substantially steady hushed sound of comparatively low pitch and reduced intensity.

A still further object of this invention is to provide an improved construction in a pneumatic rotary vertical grinder which materially attenuates the objectionable excessive whining, loud, high pitch and erratic exhaust noise that characterizes conventional tools of this type.

A pneumatic grinder embodying the invention includes a motor housing having a pneumatically rotary powered blade-type motor therein, a grinding wheel externally of the housing mounted upon the motor drive shaft, and an integral sound filter system for attenuating the objectionable exhaust noises usually associated with such tools.

The foregoing and other objects and features of this invention will appear more fully hereinafter from a consideration of the detailed description which follows, taken together with the accompanying drawings, wherein an embodiment of the invention is illustrated. It is to be expressly understood, however, that the drawings are for purposes of illustration and description; and they are not to be construed as defining the limits of the invention.

Figure 4:
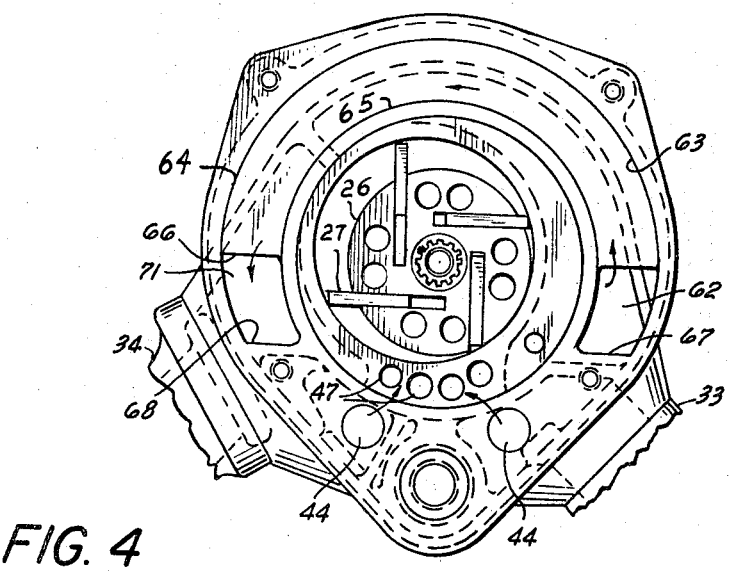
Figure 5:
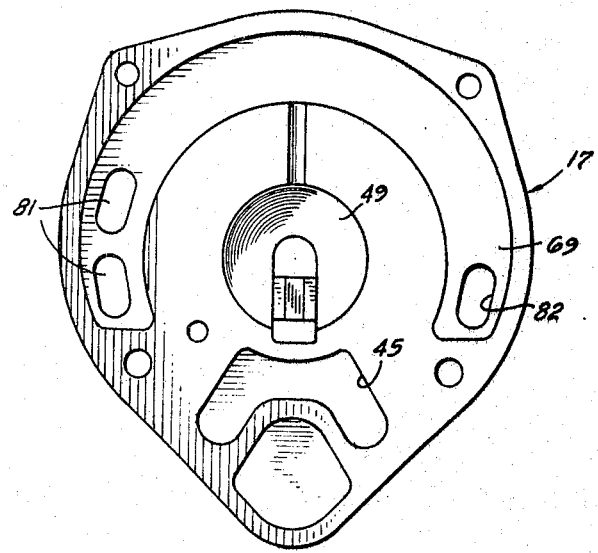
Figure 6:
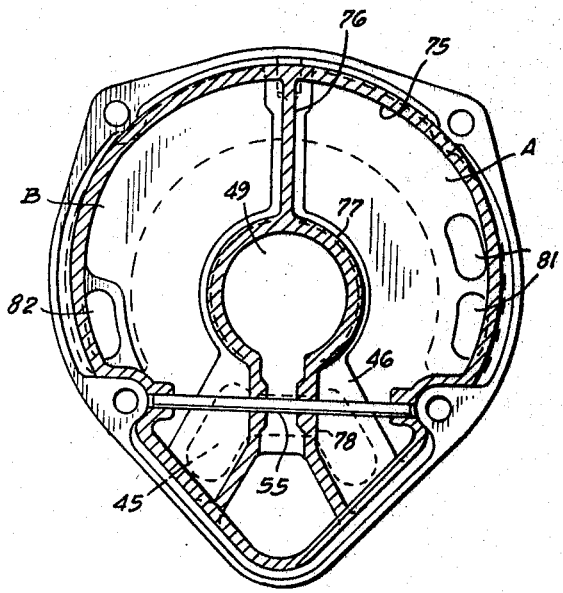
Figure 7:
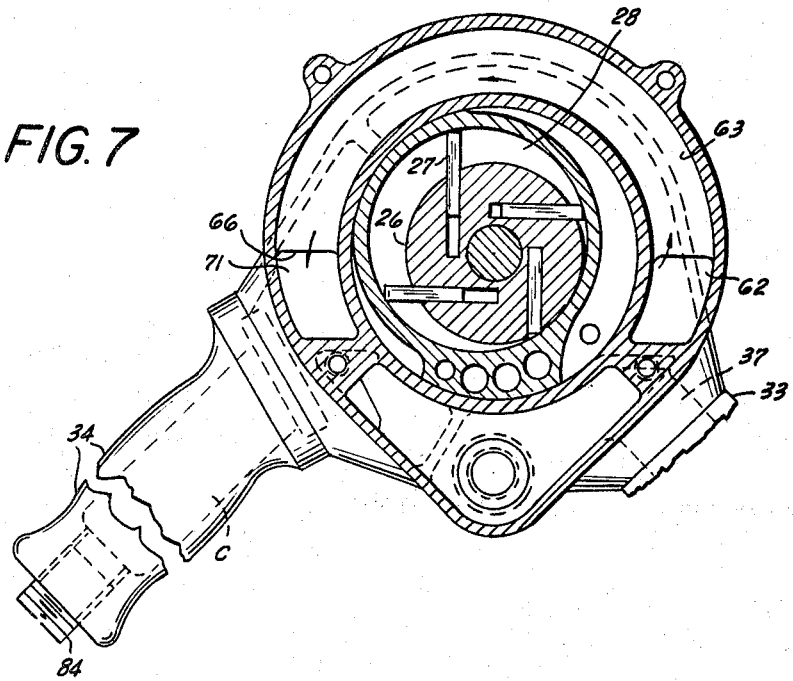
Figure 8:
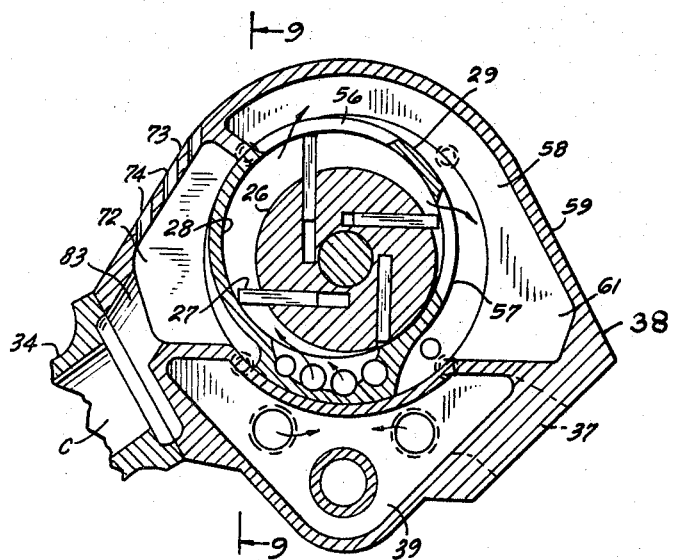
Figure 9:
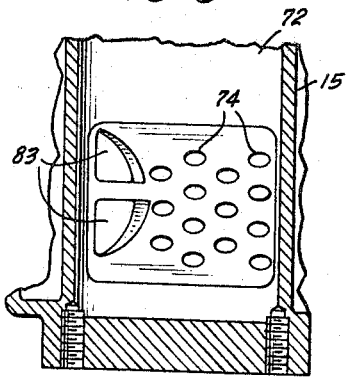
Figure 10:
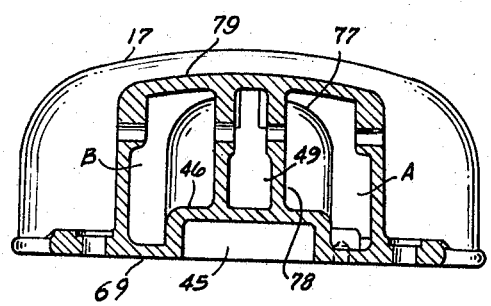
Figure 11:
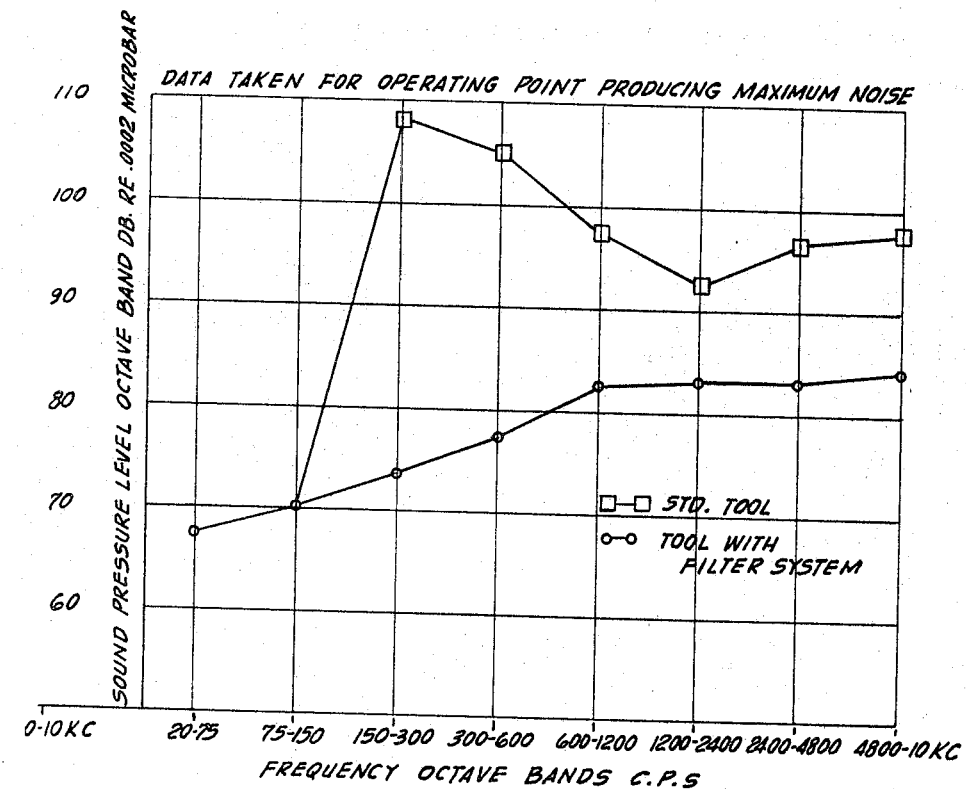

In the accompanying drawings:

FIG. 1 is a top plan view of a pneumatic vertical grinder illustrating the invention;
FIG. 2 is a vertical sectional view taken on line 2—2 of FIG. 1;
FIG. 3 is a rear elevational view of FIG. 1 with one of the handles omitted and some areas broken away;
FIG. 4 is a sectional view taken on line 4—4 of FIG. 3;
FIG. 5 is a bottom plan view of the motor housing cap;
FIG. 6 is a sectional view taken on line 6—6 of FIG. 3;
FIG. 7 is a sectional view taken on line 7—7 of FIG. 3;
FIG. 8 is a sectional view taken on line 8—8 of FIG. 3;
FIG. 9 is a sectional view taken on line 9—9 of FIG. 8;
FIG. 10 is a sectional view of the cap taken on line 10—10 of FIG. 1; and
FIG. 11 is a graph indicating the noise attenuation effected in a tool embodying the invention as compared to a tool not embodying the invention.

The pneumatically powered vertical grinding tool illustrating the invention includes a motor housing 15 in which is housed a conventional slidable blade-type pneumatic motor 16. A cap 17, bolted over the top end of the motor housing, houses a motor speed control governor 18. The motor housing is bolted at its bottom end to the upper surface of a grinding wheel guard 19. The latter has a depending skirt 21 surrounding the upper portion of a grinding wheel 22 shown in broken line. The grinding wheel is drivingly mounted to the spindle end 23 of the motor shaft 24. The general housing of the tool comprises the motor housing 15 and the cap 17.

The motor 16, which is mounted in an internal opening 25 of the motor housing, includes the usual rotor 26 having radially slidable blades 27. The rotor is supported for rotation eccentrically of a rotor chamber 28 provided by a rotor liner 29. The liner is closed over at opposite ends by the usual bearing plates 31 and 32, in which plates the ends of the rotor shaft 24 are supported for rotation.

The motor housing 15 is provided with a pair of side handles 33 and 34 (FIG. 1) which the operator grips, one in each hand, as he operates the tool. The handles extend radially from corresponding side areas of the motor housing at about 90 degrees apart. They enable the operator to effectively maneuver the tool over a work surface; and they also enable transmission by the operator of manual pressure downwardly through the housing to the grinding wheel. The handle 33 has a passage 35 therethrough which is adapted for connection at its outer end 36 to a source of pressure air, here of 90 p.s.i. The opposite end of passage 35 communicates with passage means 37 (FIG. 8) in the wall section 38 of the motor housing which leads into a control valve collecting chamber 39. A manipulative throttle valve 41 is operable by the operator to control flow of operating air through the handle 33 and the associated connecting passage means to the control valve collecting chamber 39.

A normally open control valve 42 controls flow of operating air from the chamber 39 to passage means 43 in the wall 38 of the housing. The passage means 43 opens through ports 44 (FIGS. 1, 4, 10) into a generally arcuate channel 45 (FIGS. 2, 5, 6) defined by means of a wall portion 46 of the cap. This channel overlies a plurality of ports 47 leading through the upper bearing plate and the wall of the liner to the rotor chamber 28. The control valve 42, as appears in FIG. 2, is biased by a compression spring 48 to a normally open condition whereby operating air flows from the handle passage 35 and past the valve 42 and associated passages to the rotor chamber. The flow of operating air through the valve is regulated by means of the speed control governor 18.

The speed control governor (FIG. 2) is housed in a chamber or compartment 49 of the cap. It includes a pair of centrifugally operated flyweights 51 which are pivoted in a body member 52 of the governor. This body member is mounted to the upper end of the rotor shaft 24. As the rotor develops a predetermined control speed, the flyweights swing centrifugally outward so as to slide an associated push pin 53 upwardly. This movement of the push pin actuates a lever 54 pivoted on a cross rod 55. Actuation of the lever forces the control valve downwardly against the bias of the valve spring 48 to shut off flow of operating air to the rotor chamber. It is understandable that, as the rotor slows down, the valve spring will re-expand to return the valve to open condition. By means of this arrangement the speed of the rotor and, as a consequence, the speed of the grinding wheel are prevented from exceeding a predetermined maximum.

The tool is supplied with operating air at a constant pressure of 90 p.s.i. As operating air enters the rotor chamber it forcefully attacks each blade of the rotor in succession to cause the rotor to rotate at high speed. Here, the rotor has four blades 27, and rotates unloaded at a speed of 6000 r.p.m. This high speed and the number of blades of the rotor cause spent driving air to be forcefully and rapidly pulsed from the rotor chamber at a frequency of about 400 c.p.s. The speed of the rotor and, as a consequence, this basic exhaust frequency will vary during use of the tool and in accordance with the pressure which the operator applies the tool to the work.

If this exhausting air, which is pulsating and varying in its basic frequency, were permitted as it does in conventional grinding tools to exhaust from the rotor chamber directly to atmosphere, it would produce an objectionable complex whining noise, varying in intensity and pitch, characterized by sounds of a varying low basic frequency with multiple harmonics extending through the sound frequency spectrum, and further characterized by a high decibel noise level, as indicated by the upper graph line in FIG. 11.

To hush and attenuate the objectionable nature of this exhaust noise, the tool of the present invention has integrally incorporated in its housing structure a sound attenuating filter system through which air exhausting from the rotor chamber is caused to initially flow before issuing to atmosphere. The exhaust air is caused to flow through the filter system in such manner that no undesirable back pressure develops to interfere with the operating efficiency of the rotor. The exhaust sound that finally issues from the tool to atmosphere is relatively even without objectionable variation; is substantially attenuated in pitch and intensity; and is relatively quiet, as indicated by the lower graph line in FIG. 11. To this end, the housing structure of the tool is formed so as to cause exhausting air from the rotor chamber to be initially collected and then directed in such a way that it will pass over specially designed tuned side cavities or chambers. This is done to attenuate particular frequencies that exceed an undesirable noise level in various octave bands through the sound frequency spectrum of 0 to 10 kilocycles.

The rotor liner is formed with a plurality of slots 56, 57 (FIGS. 2, 8) through which air spent in driving the rotor exhausts freely without consequent back pressure. The exhaust air flows from the slots 56, 57 of the rotor chamber into an arcuate collecting passage 58, defined between the rotor liner and a wall portion 59 of the motor housing. This collecting passage is of adequate cross sectional area to accommodate without consequent back pressure the volume of exhausting air. It is free of baffles, bottle necks, and projections. The exhausting air entering the collecting passage is guided by the curved walls of the passage to an end 61 thereof which communicates through an enlarged port 62 with an upper overhead passage 63 (FIGS. 4, 7). The collecing passage 58 (FIG. 8) progressively enlarges toward its port end 61 so that congestion of air will not develop in the flow of air through the port 62. Accordingly, the exhausting air is enabled to flow without obstruction through the port 62 into the overhead passage 63.

The overhead passage is of arcuate configuration and is formed in the general housing of the tool. It includes a pair of concentrically disposed wall portions 64, 65 (FIGS. 2–4) of the motor housing. Walls 64 and 65 are integrally joined by means of a bottom wall 66 and are closed at opposite ends by end walls 67, 68. The top of the passage is closed over by a bottom wall 69 (FIGS. 2, 5) of the housing cap 17. Port 62 opens into the overhead passage 63 at one end of the latter; a second port 71 similar in size to the first port 62 opens at the opposite end of the passage through the bottom wall 66 to communicate the overhead passage with a discharge collecting chamber 72 defined between the rotor liner 29 and an opposed wall portion 73 of the motor housing, as in FIG. 8. The collecting chamber 72 communicates to atmosphere through a plurality of vents 74 formed in the motor housing wall (FIGS. 8, 9). The cross sectional areas of the ports (62 and 71) and the overhead passage 63, and the size and quantity of the exhaust vents 74 are such as to permit free and unobstructed flow of the exhausting air to atmosphere without any attendant undesirable back pressure that would interfere with the operating efficiency of the rotor.

The pulsating nature of the exhausting air stream and of the associated sound pattern is largely smoothed out by the manner in which the air is caused to exhaust through the rotor liner into the collecting passage 58. The air exhausts from the rotor chamber through the slots 56 and 57 of the rotor liner. Here, there is a pair of the slots 56. These slots are disposed in parallel relation one above the other and extend circumferentially of the liner; a pair of the slots 57 is also provided, one being shown, which slots also are disposed in parallel relation and extend circumferentially of the liner. The slots 56 are elongated, and of greater length than the slots 57, and are disposed rearwardly (FIG. 8) of slots 57. The greater volume of air attacking each blade of the rotor exhausts through the slots 56 at the rear of the collecting passage as the blade passes over the latter slots. Residual blade air which does not escape through the longer slots 56 escapes through the slots 57 into the collecting passage. This residual air is less dense than the air escaping through the larger slots. It enters and merges with the exhaust stream in the collecting passage at a point forwardly of the larger slots and tends to smooth out the pulsating nature of the exhaust stream.

After leaving the rotor chamber and before exiting to atmosphere the exhausting air is caused to pass successively over a plurality of sound attenuating side chambers or cavities formed in the general housing of the tool. Each of these sound attenuating chambers is tuned to a different frequency, whereby undesirable sound frequencies are materially attenuated. Here, three such chambers are provided, designated as A, B, and C in the order in which the main exhausting air stream flows over them.

Chambers A and B are provided in the cap 17 of the housing above the passage 63. These chambers are identical in size and volume, one being located (FIGS. 6, 10) at one side of the cap and the other at a corresponding opposite side. Chamber A is defined by an arcuate portion 75, of the outer wall of the cap and by an inner wall comprising the contiguous sections 76, 77 and 78. Chamber B is defined by corresponding wall portions of the cap. The crown 79 of the cap serves as a common top wall for both chambers A and B; and the bottom wall 69 of the cap is common to both chambers.

Chamber A communicates with passage 63 by means of a pair of resonator throats or narrow entry ports 81 of short length. The length of each port 81 is indicated by the thickness of the bottom wall 69 of the cap through which the ports extend. These ports are disposed one following the other in close relation, so that air entering the passage 63 flows successively over the first and then over the second port. Combined, the ports 81 provide a low inertance to sound waves passing over them. Chamber A with its narrow ports serves as a resonant chamber which is tuned to a sound frequency of 600 c.p.s., so that sound frequencies above the design frequency are highly attenuated and some of the close lower frequencies are also attenuated.

Chamber B communicates with the passage 63 by means of a resonator throat or narrow entry port 82. The latter is elongated in length and provides a relatively high inertance as compared with that provided by the entry holes 81 of chamber A. The arrangement is such that chamber B is tuned to a sound frequency of about 350 c.p.s., so that sound frequencies above this tuned frequency are highly attenuated; and some of the close lower frequencies are also attenuated. It is to be noted that a lower effective frequency is provided by chamber B than is provided by chamber A. It is also to be noted that the entry holes 81 to chamber A are located at the beginning of the passage 63 opposite to port 62; and that the entry hole 82 to chamber B is located at the other end opposite to port 71. This arrangement is desirable in that it obtains a greater effectiveness of each chamber than would otherwise be obtained were the entry holes of both chambers located closer together and away from the ports 62 and 71.

The hollow dead handle 34 (FIGS. 7, 8) of the tool defines the third resonant side chamber C. A pair of resonator throats or entry holes 83 (FIGS. 8, 9) communicates chamber C through the wall of the housing with the collecting chamber 72. These ports are located in the housing wall directly below the terminal port 71 of the overhead passage 63. The large entry holes 83 combined provide a relatively low inertance for the resonant chamber C; and the relation of the entry holes 83 to the chamber C is such that the latter is tuned to a frequency of 800 c.p.s., so that frequencies above this tuned frequency including some close lower frequencies are highly attenuated.

Except for the resonator throats, chambers A, B, and C each defines a closed volume.

It is to be remembered that the fundamental exhaust frequency of the tool when applied to the work varies from the fundamental frequency of 400 c.p.s. of the tool in its unloaded condition; and that the fundamental frequency of the tool when applied to the work varies in accordance with the pressures applied to it by the operator. Accordingly, the frequency of 350 c.p.s. to which the cavity B has been tuned is within a close range of the fundamental frequency of the tool when the latter is applied to the work. This manner of tuning serves to highly attenuate the fundamental frequency of the tool and the close harmonics thereof.

It is also to be noted that the sound resonator cavities A, B and C are arranged so that the lowest frequency tuned cavity is spaced between and as far as possible from the other two, and that the cavity A is tuned to a frequency of 600 c.p.s. lying between the frequencies of the other two cavities. This arrangement is desirable in that cavity A serves to highly attenuate the higher frequencies and some of the close lower frequencies. This initial attenuation provides fewer frequencies in the more objectionable bands to be attenuated by the intermediate cavity B.

It is also to be noted that a plug 84 threaded on the end of the handle 34 closes the bottom end of chamber C. This arrangement is of advantage in that the tuned frequency of chamber C may be slightly varied accordingly as the plug 84 is threaded inwardly or outwardly of the handle to vary the length of the chamber.

What is claimed is:

1. A pneumatically powered rotary grinding tool comprising a pneumatically driven multiple blade-type motor, a housing for the tool encasing the motor, a plurality of separate sound resonator cavities in the housing, each tuned to a different and specific sound frequency and having a resonator throat means, passage means in the housing for receiving exhaust air from the motor and guiding it successively over the resonator throat means of the resonator cavities, and vent means in the housing for finally exhausting the exhaust air to atmosphere, the passage and vent means being sufficient to allow unrestricted exhaust flow therethrough.

2. A pneumatically powered rotary grinding tool comprising a pneumatically driven multiple blade-type motor, a housing for the tool encasing the motor, the housing having a pair of side handles adapted to be held by the operator for maneuvering the tool over a work surface, a plurality of separate sound resonator cavities in the housing each tuned to a different and specific sound frequency, passage means in the housing having a separate side entry port means connection with each of the resonator cavities, the passage means serving to receive the exhaust air from the motor and to guide it successively over the entry ports of the resonator cavities, and vent means in the housing for finally exhausting the exhaust air to atmosphere, one of the handles being hollow and defining one of the sound resonator cavities, and the passage and vent means being sufficient in cross sectional area to allow unrestricted exhaust flow therethrough.

3. A pneumatically powered rotary grinding tool as in claim 2, wherein means is provided closing over a bottom end of the cavity defined in the handle for selectively adjusting the length of the said cavity and as a consequence changing the tuned frequency thereof.

4. A pneumatically powered rotary grinding tool as in claim 2, wherein the exhaust air from the motor has a complex noise pattern impressed thereon including a fundamental frequency varying within a close range during application of the tool to the work, at least one of the sound resonator cavities is tuned to a frequency within this fundamental frequency range, a second one of the cavities is tuned to a frequency above the fundamental frequency range and a third one of the cavities is tuned to a frequency above that of the second cavity, and the cavities are so located relative to the passage means that the exhaust air passes in order over the second cavity, then over the cavity tuned to a frequency within the range of the fundamental frequency, and finally over the third cavity.

5. A pneumatically powered rotary grinding tool as in claim 2, wherein the passage means includes a collecting passage portion into which exhaust air from the motor is initially received, a second passage portion having an entry port at one end communicating with an end of the collecting passage portion and having a discharge port at the other end, the side entry port means connection with one of the resonator cavities being located opposite to the entry port of said second passage, and the side entry port means connection of another of the sound resonator cavities being located opposite the said discharge port.

6. In a pneumatic grinding tool including an air motor comprising a rotor liner defining a rotor chamber having an air driven multiple blade-rotor operating therein and having ports for the discharge of exhaust air, and a grinding wheel mounted to the rotor; a housing for the tool encasing the motor and having handle means adapted to be held by an operator for maneuvering the tool over a work surface, the housing further having a first passage communicating at one end thereof with the exhaust ports for receiving the exhaust air and guiding it toward its opposite end, a second passage having at one end an entry port communicating with said opposite end of the first passage, a final collecting chamber, the second passage having a discharge port at its opposite end opening into the final collecting chamber, final exhaust ports venting the collecting chamber to atmosphere, a pair of sound resonator cavities each having a separate resonator throat means connection with the second passage, and a further sound resonator cavity having a resonator throat connection with the final collecting chamber, the handle means having a hollow portion defining the said further resonator cavity, and each sound resonator cavity being tuned to a different and specific sound frequency.

7. In a pneumatic grinding tool as in claim 6, wherein exhaust air from the motor has a complex noise pattern impressed thereon having a fundamental frequency varying within a close range, one of the sound resonator cavities has a tuned frequency lying within this range, and each of the other cavities has a tuned frequency outside of said range.

8. In a pneumatic grinding tool as in claim 6, wherein the first and second passages conform to the contour of the outer wall of the housing and the second passage is located above and concentrically with the first passage.

9. In a pneumatic grinding tool as in claim 6, wherein manipulative closure means is provided in the handle means whereby the length of the resonator cavity in the handle means and as a consequence the tuned frequency of said cavity is manually adjustable.

10. In a pneumatic grinding tool as in claim 6, wherein the housing comprises a section surrounding the motor which is open at its upper end and further comprises a crown cap removably closing over the said upper end, the cap being characterized by a central compartment having a speed control governor operatively associated with the rotor, and by the said pair of sound resonator cavities, said cavities being located at correspondingly opposite sides of the said compartment.

References Cited
FOREIGN PATENTS

| | | |
|---|---|---|
| 153,219 | 9/1953 | Australia. |
| 188,642 | 11/1923 | Great Britain. |
| 449,497 | 6/1936 | Great Britain. |
| 484,121 | 5/1938 | Great Britain. |

RICHARD B. WILKINSON, *Primary Examiner.*

R. S. WARD, JR., *Assistant Examiner.*